United States Patent Office 2,956,209
Patented Oct. 11, 1960

2,956,209

APPARATUS FOR MEASURING THE RATIO OF TWO VARIABLES, PARTICULARLY TWO SPEEDS OF REVOLUTION

Friedrich Kührt, Nurnberg, Germany, and Eberhard Braünersreuther, Geneva, Switzerland, assignors to Siemens-Schuckertwerke Aktiengesellschaft, Berlin-Siemensstadt, Germany, a corporation of Germany Original application Sept. 21, 1954, Ser. No. 464,117. Divided and this application Feb. 4, 1958, Ser. No. 713,155

Claims priority, application Germany Sept. 21, 1953

13 Claims. (Cl. 317—6)

Our invention, disclosed and claimed hereinafter as a division from a copending application Serial No. 464,117, filed September 21, 1954, relates to computing apparatus for providing an electric output magnitude proportional to the ratio of two variable input values, for the purpose of indicating such ratio or effecting a control or regulation in dependence thereupon. In a more particular aspect our invention relates to apparatus for forming a ratio of two variable speeds of revolution.

As a rule, the ratio of two revolving speeds is measured by translating the two speeds into two voltages and electrically comparing the voltages with each other. It is customary to produce the speed-responsive voltages with the aid of tachometer generators. The computing means heretofore used for correlating the two tachometer voltages and providing the desired ratio-proportional output are rather intricate and leave much to be desired as to accuracy of the measured ratio value.

It is an object of our invention to minimize such deficiencies and to provide a reliable speed-ratio computing apparatus of improved accuracy and reduced space requirements. Another, subsidiary object is to devise ratio forming equipment that, for the purpose of ratio computation, is not necessarily dependent upon the use of an amplifier between the speed-responsive input circuits and the ratio forming output circuitry proper so as to permit operating a current consuming load, such as an electromagnetic relay or a current amplifier directly from the output voltage or output current of the computing portion of the apparatus.

According to our invention, we subject a magnetically responsive resistance member, preferably a semiconductor body as more fully described below, to a magnetic field controlled by one of the two value-denoting or speed-responsive voltages and we pass through the resistance member an electric current caused by the other voltage, one of the two voltages being proportional to the other input value or speed responded to. The output of the apparatus is taken from a pair of Hall electrodes on the resistance member. Such an apparatus can be operated either with two alternating signal voltages of which one is passed through inverting means, or with one alternating voltage and one direct voltage. In the case of two alternating voltages, it is advantageous to rectify the voltage supplied to the coil for producing the magnetic field, and it is preferable to energize the resistance member through the voltage inverting means.

As mentioned above, the resistance member having a resistance controllable by a magnetic field, consists preferably of a semiconductor. Particularly advantageous are semiconductor compounds of high carrier mobility, namely a mobility greater than 6000 cm.$^2$/volt sec. and preferably greater than 10,000 cm.$^2$/volt sec. Semiconductor materials suitable for the present invention by virtue of such a high carrier mobility are described, for instance, in the copending application of H. Welker, Serial No. 275,785, filed March 10, 1952, now Patent 2,789,989, assigned to the assignee of the present invention. The semiconductors according to that application are compounds of the form $A_{III}B_V$, i.e. they consist of binary intermetallic compounds of elements of the third and fifth groups of the periodic system. Best suitable among the compounds of this kind are indium arsenide and indium antimonide, both having a carrier mobility above 20,000 cm.$^2$/volt second, a mobility as high as about 60,000 cm.$^2$/volt second having been attained with indium antimonide. In contrast, the carrier mobility of germanium is only about 3000 cm.$^2$/volt second. The electrical characteristics of indium arsenide, within the temperature range of practical application, is substantially independent of the temperature, this being of importance for high accuracy of ratio-forming operation. By virtue of such semiconductor materials, the speed-ratio-proportional power output of devices according to the invention can be given a rated value of as much as 50 to 100 milliwatts or more.

The foregoing and other objects, advantages and features of the invention will be apparent from the following description in conjunction with the embodiments of the invention shown in the accompanying drawings wherein.

Figure 1:
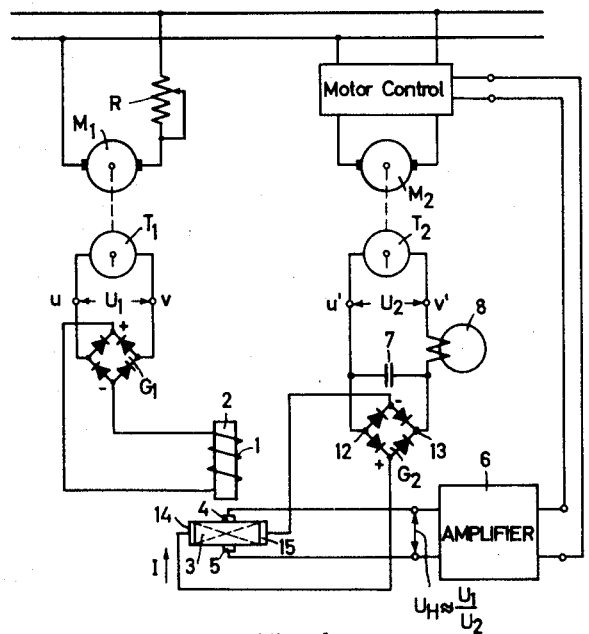
Fig. 1 is a circuit diagram of a control system for regulating the speed of one drive motor so as to maintain it at a constant ratio to the variable speed of another motor.
Figure 4:
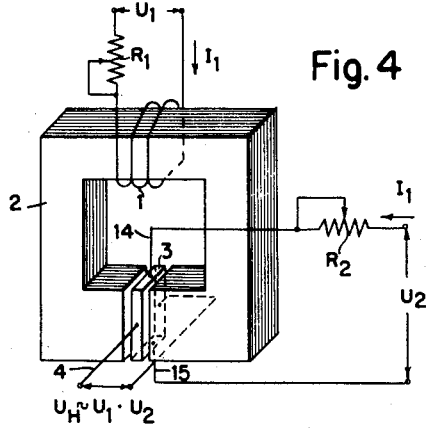
Fig. 4 is a schematic and perspective view of the magnetically controllable resistance device of the same control system.

According to Fig. 1, two electric motors $M_1$ and $M_2$, for instance of a paper machine drive or other fabricating line, are to run in a given speed ratio to each other regardless of changes in speed. The motor $M_1$ is adjustable to a desired speed by means of a speed-setting control schematically represented by a rheostat R. The motor $M_2$ is speed controlled to automatically change and maintain its speed at a fixed ratio to that of motor $M_1$ depending upon the particular processing requirements. The two motors are coupled with respective tachometer dynamos $T_1$ and $T_2$ which generate alternating voltages $U_1$ and $U_2$ across respective terminal pairs $u$, $v$ and $u'$, $v'$. The voltage $U_1$, whose amplitude varies in accordance with the speed of motor $M_1$, is applied through a bridge-type rectifier $G_1$ to the coil 1 of an electromagnet whose iron core is denoted by 2 and more fully shown in Fig. 4. A semiconductor resistance member 3, preferably of indium antimonide or indium arsenide, is located within the magnetic field produced by the coil 1.

The current supply terminals 14 and 15 of member 3 are connected across the direct-current output terminals of a full-wave rectifier $G_2$.

Rectifier $G_2$ is energized by the voltage $U_2$ through inverting means for producing a reciprocal value $$\frac{1}{U_2}$$

of the voltage $U_2$. These inverting means consist, for example, of a capacitor 7 and of a reactor 8 having a rectangular hysteresis loop. Such reactors, as known, may be provided with a core of a 50 percent nickel-iron alloy having a recrystallization texture. Applicable core materials of rectangular hysteresis characteristic are known under the trade name "Permenorm 5000Z" in Germany, and under the trade names "Permeron," "Ortholol," and "δ-max" in the United States.

Reverting to Fig. 1, a value proportional to the quotient $$\frac{U_1}{U_2}$$

and hence corresponding to the desired speed ratio is available from across the Hall electrodes 4 and 5 of the semiconductor member 3. This will be understood from the following.

The value of the Hall voltage $U_H$ across electrodes 4 and 5, can be expressed by the equation $U_H = C \cdot BI$, wherein B denotes the strength of the magnetic field applied to the semiconductor resistor member 3 by means of the winding 2; and I is the current flowing in the semiconductor member 3 through its terminals 14 and 15. The quotient of the two voltages $U_1$ and $U_2$ is produced with the help of the reciprocal-value producing means 7, 8. If the alternating voltage applied to the capacitor 7 had a constant amplitude, it would provide a speed-responsive reciprocal voltage even without the reactor 8, provided an ohmic resistor is connected in series with the capacitor. Consequently, if tachometer generators of speed-responsive frequency but constant amplitude are available for use as the tachometer generator $T_2$, the reactor 8 need not be used but may be replaced by a resistor. It is to be noted, however, that the tachometer $T_1$ is of the type whose output voltage amplitude varies with speed, so that a direct voltage proportional to the speed of the motor $M_1$ is applied to the coil 1 of electromagnet 2. The commonly available alternating-current tachometer dynamos, however, vary the amplitude as well as the frequency of the generated voltage with changes in speed; and in such cases the provision of the above-described reactor 8 of rectangular magnetic characteristic, or of an equivalent amplitude limiting device, is necessary. The reactor 8 limits the amplitude of the voltage $U_2$ having a frequency proportional to speed and produces a rectangular-wave current in the circuit $u'$, 7, 8, $v'$. This rectangular current is applied as a charging current to the capacitor 7, thereby producing across the capacitor 7 a triangular voltage wave with an amplitude inversely proportional to the tachometer frequency.

Figure 2:
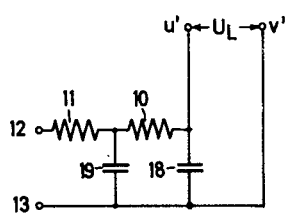
Fig. 2 illustrates a modification of a voltage inverting circuit component applicable in a system otherwise similar to that of Fig. 1.

Instead of the reciprocal value producing circuit means 7, 8 shown in Fig. 1, other inverting means may be used, for example, as illustrated in Fig. 2. A two-link resistor-capacitor chain, comprising two capacitors 18, 19 and two resistors 10, 11 is employed instead of the capacitor 7 and the reactor 8 shown in Fig. 1. The RC circuit of Fig. 2 is to be connected to terminals 12 and 13 of the rectifier $G_2$.

As mentioned above, the amplitude-limiting reactor 8 of rectangular magnetic characteristic can be eliminated if the speed-responsive voltage $U_2$ is supplied from a tachometer generator whose alternating-voltage amplitude is independent of the speed. Such constant-amplitude generators are available in the known rotating commutators that periodically change the polarity of a constant direct voltage thus converting it into a square-wave alternating voltage. These devices are unsatisfactory because of the necessity of using mechanical commutator contacts.

However, according to another feature of the invention, a simple and reliable constant-amplitude tachometer alternator avoiding the disadvantages of mechanical contact devices can be used. This tachometer device comprises a permanent magnet. A semiconductor member of magnetically responsive resistance is disposed in the air gap of the magnet. The magnet is revolvable and is coupled with the motor or machine part whose speed is to be measured, while the semiconductor member is stationary, or vice versa. Consequently, the magnetic field effective in the semiconductor element periodically varies its direction relative to the semiconductor. The semiconductor member is energized from a direct-current source of constant voltage. Due to the rotation of the magnetic field, the voltage drop along the semiconductor member, or any Hall voltage taken from the member, is an alternating voltage whose frequency depends upon the speed being measured but whose amplitude is independent of that speed. Preferably, the alternating Hall voltage of such a device is employed as the output voltage ($U_1$ or $U_2$). If desired, the output voltage of the device can be given a rectangular wave, but this is not imperative because, for obtaining the above-described inversion by means of a capacitor, it is merely required to make the voltage amplitude independent of the speed.

Figure 3:
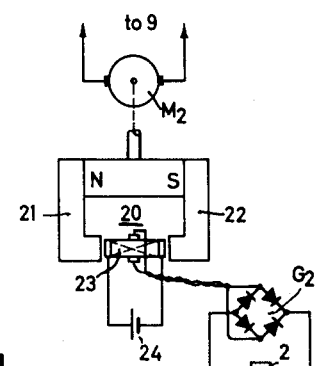
Fig. 3 shows a modification of a tachometer device also applicable in a system otherwise similar to that of Fig. 1.

A preferred example of the above-mentioned tachometer device is illustrated at 20 in Fig. 3. This device may replace the alternating-voltage tachometer $T_2$ as well as the reactor 8 of Fig. 1. The motor $M_2$, the rectifier $G_2$, the coil 1 of electromagnet 2, and the semiconductor body 3 are the same as in Fig. 1, the other details of Fig. 1 being omitted. The tachometer device 20 comprises a rotatable permanent magnet NS coupled with the motor $M_2$, and two magnetic poles 21 and 22 forming an air gap. A semiconductor body 23 of the same character as the semiconductor body 3 is disposed in the air gap between the poles 21 and 22 of the magnet. The semiconductor body 23 is traversed by direct current from a source 24 of constant voltage. Due to the rotation of the magnetic field of magnet NS the voltage taken from the Hall electrodes of the body 23 is an alternating voltage whose frequency is responsive to the speed of the motor $M_2$ but whose amplitude is independent of that speed. Conventional inverting means for producing a reciprocal value $$\frac{1}{U_2}$$

can be used, analogous to that described for the previous embodiments.

It will be apparent from the foregoing to those skilled in the art that our invention can be used for various ratio-dependent control and regulating purposes and may be modified in various respects and be embodied in devices other than those specifically illustrated and described, without departing from the essence of the invention and within the scope of the claims annexed hereto.

We claim:

1. Apparatus for measuring the ration of two variable input values, comprising a voltage source having a voltage variable in proportion to one of said values, another voltage source having a voltage variable in inverse proportions to the other value, a magnetic-field responsive resistance member having two current-supply terminals and two Hall electrodes, a magnetic field structure having a field control winding, said member being fixedly disposed in the field of said structure to vary its resistance under control by said winding, two input circuits individually connected to said winding and to said terminals respectively, said two sources being connected in different ones of said two input circuits, and an output circuit means connected across said electrodes for providing a voltage proportional to said ratio.

2. Apparatus for measuring the ratio of two speeds of revolution, comprising two means for producing voltages proportional to the two speeds respectively, a magnetic-field responsive resistance member having two current-supply terminals and two Hall electrodes, a magnetic field structure having a field control winding, said member being disposed in the field of said structure to vary its resistance under control by said winding, two input circuits individually connected to said winding and to said terminals respectively, one of said voltage producing means being connected to one of said input circuits to energize it in proportion to one of said voltages, voltage inverting means connecting said other voltage producing means to said other input circuit to energize it in inverse proportion to the other voltage, and an output circuit connected across said electrodes, whereby said output circuit is impressed by voltage proportional to said speed ratio.

3. Apparatus for forming an electric voltage proportional to the ratio of two speeds of revolution, comprising a speed-responsive voltage source having a voltage proportional to one of said two speeds, another speed-responsive voltage source having a voltage inversely proportional to the other speed, a semiconducting resistance member of substance selected from the group consisting of indium antimonide and indium arsenide, said member having two terminals and two Hall electrodes, an electromagnet having a field gap and having a field control winding, said member being disposed in said gap for varying its resistance under control by said winding, two input circuits individually connected to said winding and to said terminals respectively, one of said voltage sources being connected to one of said input circuits, said other source being connected to said other input circuit, and an output circuit connected across said electrodes, whereby said output circuit is impressed by voltage proportional to said speed ratio.

4. Apparatus for providing a ration of two speeds of revolution, comprising a semiconductor body, a pair of Hall electrodes on said semiconductor body, means for producing a magnetic field, said semiconductor body being so disposed in said magnetic field as to be influenced thereby to produce a Hall voltage across said electrodes, circuit means connected with said body for passing a current through said semiconductor body, means for producing a first voltage proportional to one of said speeds of revolution, means for producing a second voltage inversely proportional to the other of said speeds of revolution, said two voltages being applied to correspondingly control the field strength of said magnetic field and the current in said circuit, respectively, whereby an output voltage proportional to the ratio of said speeds of revolution is produced across said Hall electrodes.

5. In apparatus according to claim 4, said first and second voltages being both alternating voltages, and a full-wave-rectifier connecting one of said voltage producing means with said field means, and a full wave rectifier connecting the other voltage producing means to the circuit means for passing a current through said body.

6. Apparatus for providing a ratio of two speeds of revolution comprising a semiconductor body, a pair of Hall electrodes on said semiconductor body, means for producing a magnetic field, said semiconductor body being so disposed in said magnetic field as to be influenced thereby to produce a Hall voltage across said electrodes, a first alternating-current tachometer generator means for producing a first alternating voltage proportional to one of said speeds, voltage-wave inverting means connected with said first generator means for providing a voltage reciprocal to said one speed, said inverting means being connected with said body to drive therethrough a current corresponding to said reciprocal voltage, a second tachometer generator means for producing a second voltage proportional to the other speed, and circuit means connecting said second generator with said magnetic-field means for varying the field in accordance with said second voltage, whereby an output voltage proportional to the quotient of said speeds of revolution is produced across said Hall electrodes.

7. Apparatus for maintaining a given ratio of two variable speeds of revolution, comprising a first drive of adjustable revolving speed, and means for producing a voltage proportional to said speed; a second drive having speed control means for varying its speed, and means for producing a voltage inversely proportional to said latter speed, a semiconductor member having two terminals and two Hall electrodes, an electromagnet having a field gap and having a field control winding, said member being disposed in said field gap for varying its resistance under control by said winding, two input circuits individually connected to said winding and to said terminals respectively, one of said voltage sources being connected to one of said input circuits, said other source being connected to said other input circuit, and an amplifier primarily connected across said electrodes and secondarily connected to said speed control means for causing it to vary the speed of said second drive in dependence upon the speed of said first drive so as to maintain said speed ratio.

8. Apparatus for providing a ratio of two speeds of revolution, comprising a semiconductor body, a pair of Hall electrodes on said semiconductor body, means for producing a magnetic field, said semiconductor body being so disposed in said magnetic field as to be influenced thereby to produce a Hall voltage across said electrodes, circuit means connected with said body for passing a current through said semiconductor body, means for producing a first voltage proportional to one of said speeds of revolution, means for producing a second voltage inversely proportional to the other of said speeds of revolution, said two voltages being applied to correspondingly control the field strength of said magnetic field and the current in said circuit, respectively, whereby an output voltage proportional to the ratio of said speeds of revolution is produced across said Hall electrodes, said means for producing the second voltage inversely proportional to speed comprising a condenser in series with a reactor, said reactor having a rectangular hysteresis characteristic.

9. Apparatus for providing a ratio of two speeds of revolution, comprising a semiconductor body, a pair of Hall electrodes on said semiconductor body, means for producing a magnetic field, said semiconductor body being so disposed in said magnetic field as to be influenced thereby to produce a Hall voltage across said electrodes, circuit means connected with said body for passing a current through said semiconductor body, means for producing a first voltage proportional to one of said speeds of revolution, means for producing a second voltage inversely proportional to the other of said speeds of revolution, said two voltages being applied to correspondingly control the field strength of said magnetic field and the current in said circuit, respectively, whereby an output voltage proportional to the ratio of said speeds of revolution is produced across said Hall electrodes, said means for producing the second voltage inversely proportional to speed including an alternating-current tachometer generator having a voltage amplitude independent of speed.

10. Apparatus for providing a ratio of two speeds of revolution, comprising a semiconductor body, a pair of Hall electrodes on said semiconductor body, means for producing a magnetic field, said semiconductor body being so disposed in said magnetic field as to be influenced thereby to produce a Hall voltage across said electrodes, circuit means connected with said body for passing a current through said semiconductor body, means for producing a first voltage proportional to one of said speeds of revolution, means for producing a second voltage inversely proportional to the other of said speeds of revolution, said two voltages being applied to correspondingly control the field strength of said magnetic field and the current in said circuit, respectively, whereby an output voltage proportional to the ratio of said speeds of revolution is produced across said Hall electrodes, said means for producing the second voltage inversely proportional to speed comprising a two-link RC chain circuit.

11. Apparatus for providing a ratio of two speeds of revolution, comprising a semiconductor body, a pair of Hall electrodes on said semiconductor body, means for producing a magnetic field, said semiconductor body being so disposed in said magnetic field as to be influenced thereby to produce a Hall voltage across said electrodes, circuit means connected with said body for passing a current through said semiconductor body, means for producing a first voltage proportional to one of said speeds of revolution, means for producing a second voltage inversely proportional to the other of said speeds of revolution, said two voltages being applied to correspondingly control the field strength of said magnetic field and the current in said circuit, respectively, whereby an output voltage proportional to the ratio of said speeds of revolution is produced across said Hall electrodes, said second voltage producing means including an alternating-voltage generator having a voltage amplitude independent of speed, said generator having a magnet rotatable at the speed to be responded to and having an air gap, a stationary semiconductor body in said gap so as to be subjected to a rotating magnetic field during rotation of said magnet, a direct-current source of constant voltage connected to said body to pass current therethrough, said body having Hall electrodes to furnish said alternating voltage of speed-independent amplitude.

12. Apparatus for maintaining a given ratio of two variable speeds of revolution, comprising a first drive of adjustable revolving speed, and means for producing a voltage proportional to said speed; a second drive having speed control means for varying its speed, and means for producing a voltage inversely proportional to said latter speed, a semiconductor member having two terminals and two Hall electrodes, an electromagnet having a field gap and having a field control winding, said member being disposed in said gap for varying its resistance under control by said winding, two input circuits individually connected to said winding and to said terminals respectively, one of said voltage sources being connected to one of said input circuits, said other source being connected to said other input circuit, and an amplifier primarily connected across said electrodes and secondarily connected to said speed control means for causing it to vary the speed of said second drive in dependence upon the speed of said first drive so as to maintain said speed ratio, said voltages being both alternating voltages, said input circuits including a full wave rectifier connecting one of the means for producing alternating voltage with said field control winding to energize the latter, and a full wave rectifier connecting the other of the means for producing alternating voltage to said terminals of the semiconductor member.

13. Apparatus for maintaining a given ratio of two variable speeds of revolution, comprising a first drive of adjustable revolving speed, and means for producing a voltage proportional to said speed; a second drive having speed control means for varying its speed, and means for producing a voltage inversely proportional to said latter speed, a semiconductor member having two terminals and two Hall electrodes, an electromagnet having a field gap and having a field control winding, said member being disposed in said gap for varying its resistance under control by said winding, two input circuits individually connected to said winding and to said terminals respectively, one of said voltage sources being connected to one of said input circuits, said other source being connected to said other input circuit, and an amplifier primarily connected across said electrodes and secondarily connected to said speed control means for causing it to vary the speed of said second drive in dependence upon the speed of said first drive so as to maintain said speed ratio, said voltages being both alternating voltages, said input circuits including a full wave rectifier connecting one of the means for producing alternating voltage with said field control winding to energize the latter, and a full wave rectifier connecting the other of the means for producing alternating voltage to said terminals of the semiconductor member, the semiconductor member being formed of a semiconductor compound taken from the group consisting of indium arsenide and indium antimonide having a carrier mobility of at least 20,000 cm.$^2$/volt second.

References Cited in the file of this patent
UNITED STATES PATENTS

| | | |
|---|---|---|
| 2,248,504 | Kenny | July 8, 1941 |
| 2,543,640 | Millar | Feb. 27, 1951 |
| 2,616,074 | McCreary | Oct. 28, 1952 |
| 2,752,434 | Dunlap | June 26, 1956 |

UNITED STATES PATENT OFFICE
CERTIFICATION OF CORRECTION

Patent No. 2,956,209                                October 11, 1960

Friedrich Kuhrt et al.

It is hereby certified that error appears in the above numbered patent requiring correction and that the said Letters Patent should read as corrected below.

In the grant, lines 1 and 2, and in the heading to the printed specification, lines 5 and 6, for "Friedrich Kührt, of Nurnberg, Germany, and Eberhard Braünersreuther, of Geneva, Switzerland," each occurrence, read -- Friedrich Kuhrt, of Nurnberg, Germany, and Eberhard Braunersreuther, of Geneva, Switzerland, --.

Signed and sealed this 25th day of April 1961.

(SEAL)
Attest:

ERNEST W. SWIDER                                    DAVID L. LADD
Attesting Officer                                        Commissioner of Patents